Patented Aug. 17, 1948

2,447,175

UNITED STATES PATENT OFFICE 2,447,175

GUANAMINE COMPOUNDS

Adolf Grün, deceased, late of Basel, Switzerland, by Franz Grün, administrator, Basel, Switzerland, assignor to J. R. Geigy A. G., Basel, Switzerland No Drawing. Application February 9, 1948, Serial No. 7,291. In Switzerland April 25, 1939

4 Claims. (Cl. 260—249.5)

The present application is concerned, more particularly, with those triazino compounds (2-substituted guanamines) which correspond to the formula

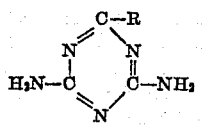

wherein R is an aliphatic radical having at least nine carbon atoms. Illustrative compounds of this character are inter alia the following: stearoguanamine, palmitoguanamine, lauroguanamine, decanoguanamine, myristoguanamine, $\alpha:\alpha$ - dichlorostearoguanamine, oleoguanamine, linoleoguanamine and the like.

The invention is based upon the observation that, contrary to expectations in view of the prior art experiences with this type of compound, it is possible to obtain the aforesaid 2-substituted guanamines, which may also be regarded as 2:4-diamino-1:3:5-triazino compounds, very readily and in smooth manner by the reaction under suitable conditions between biguanide and the corresponding carboxylic acid halide. In this connection, it is preferred to carry out the reaction in a medium containing a non-caustic acid-binding agent.

The compounds of the present invention may serve as intermediate products for the manufacture of medicinal and therapeutic substances and dyestuffs, as well as textile assistants, softening agents, etc. As pointed out in the parent specification, those compounds inter alia are especially valuable which contain a high molecular non-aromatic hydrocarbon radical, e. g., the alkyl group of a saturated or an unsaturated fatty acid, in the 6-position according to the numbering

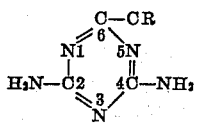

(2:4-diamino-1:3:5-triazine numbering) which corresponds to the 2-position according to the numbering

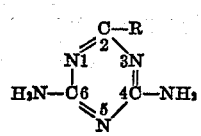

(2-guanamine numbering).

The present application is in part a continuation of copending application S. N. 434,624, filed March 13, 1942, and entitled "Manufacture of 2:4-diamino - 1:3:5-triazines," now Patent No. 2,437,691, issued March 16, 1948. The appended claims correspond to claims 10 to 13, respectively, of the last-named application.

The invention is illustrated, but not limited, by the following examples, the parts being by weight except as otherwise indicated.

Example 1

20 parts of biguanide are dissolved in 400 parts of toluene, 24 parts of anhydrous soda (sodium carbonate) are added and gradually combined while stirring at 50–60° C. with 42 parts of lauric acid chloride dissolved in the same quantity of toluene. The temperature is raised gradually to and then maintained for 16 hours at 110° C., after which it is allowed to drop to 80° C. Alcohol is then added, and the solution is filtered off from the salt residue and concentrated in vacuo. The resulting product is lauroguanamine.

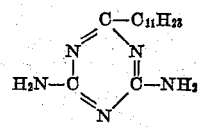

and has a melting point of 115–110° C.

Example 2

The product of Example 1 may also be obtained by mixing a solution of 10 parts of biguanide dissolved in 200 parts of ethanol with 32 parts of methyl laurate and about 50 parts of sodium methoxide. After refluxing for several hours and allowing the product to stand, lauroguanamine separates out. The refluxing step may be omitted if desired.

Example 3

120 parts of stearic acid chloride diluted with the same quantity of chlorobenzene are gradually introduced, while stirring thoroughly at 50° C., into a solution of 40 parts of biguanide in 800 parts of chlorobenzene, after having added 45 parts of anhydrous soda (sodium carbonate). The mixture is heated to 110–115° C. for 14 hours, after which it is diluted at about 80° C. with half its volume of methanol, filtered and concentrated in vacuo. Stearoguanamine

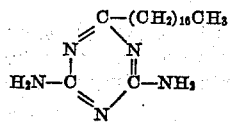

of melting point 112–117° C. is thus obtained.

Example 4

The product of Example 3 may also be obtained by adding to 150 parts of biguanide dissolved in 1200 parts of methanol, 298 parts of methyl stearate dissolved in 400 parts of ethanol and about 180 parts of sodium methoxide. After stirring for several hours, the precipitate is filtered and washed with methanol and the filtrate is then concentrated to about ⅓ its volume. 50 parts of concentrated sulfuric acid dissolved in 150 parts of methanol are then added, the precipitated sodium sulfate is filtered from the hot solution which, after cooling, deposits stearoguanamine.

Example 5

10 parts of biguanide and 20 parts of decanoic acid chloride are mixed carefully in a large excess of acetone. The reaction mixture is refluxed, while stirring, and the precipitated biguanide hydrochloride is filtered off. On cooling the filtrate, decanoguanamine

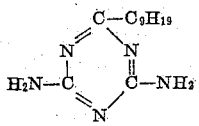

crystallizes out and, after recrystallization from pyridine and ethyl acetate, the product has a melting point of 118–120° C.

Example 6

To a solution of 20 parts of biguanide in 400 parts of toluene there are first added 24 parts of anhydrous sodium carbonate and then 48 parts of myristic acid chloride dissolved in the same quantity of toluene, the last-named addition being effected gradually and while stirring at about 60° C. After heating for a number of hours to about 110° C., the mixture is cooled, alcohol is added and the precipitate filtered off. Upon concentrating the filtrate myristoguanamine

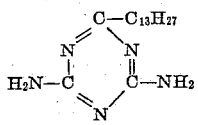

having a melting point of 114–116.5° C. separates out. The same guanamine may also be obtained by the reaction between biguanide and methyl myristate according to the process outlined in Example 2.

Example 7

24 parts of anhydrous sodium carbonate are added to a solution of 20 parts of biguanide in 400 parts of chlorobenzene. 54 parts of palmitic acid chloride diluted with 100 parts of chlorobenzene are then added gradually and while stirring thoroughly at 50° C. The mixture is kept at about 115° C. for 14 hours, cooled, diluted with methanol, filtered and concentrated in vacuo. Palmitoguanamine

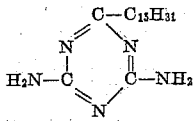

of melting point 113–118° C. is thus obtained.

Palmitoguanamine may also be obtained by treating 125 parts of sodium as sodium methoxide with 284 parts of ethyl palmitate, and diluting the solution with 200 parts of anhydrous ethanol.

Example 8

To 25 parts of biguanide dissolved in 160 parts of methanol are added 114 parts of ethyl dichlorostearate and 6 parts of sodium dissolved in 80 parts of ethanol. After standing for a short time, the product begins to precipitate from the solution. The product, α:α-dichlorostearoguanamine

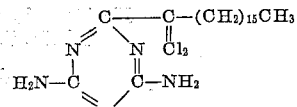

is recovered by filtration.

Example 9

To 10 parts of biguanide dissolved in about 40 parts of methanol are added 44 parts of methyl oleate and 23 parts of sodium dissolved in 40 parts of methanol. The formed oleoguanamine

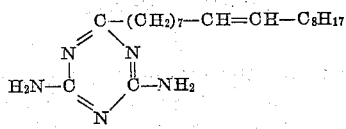

begins to separate from the solution, after standing for a short time, and may be isolated by filtration.

Example 10

24 parts of anhydrous sodium carbonate are added to a solution of 20 parts of biguanide in 400 parts of chlorobenzene. 59 parts of linoleyl chloride diluted with 100 parts of chlorobenzene are then added gradually and while stirring thoroughly at 50° C. The mixture is kept at about 110° C. for 12 hours, cooled, diluted with methanol, filtered and concentrated in vacuo. Linoleoguanamine

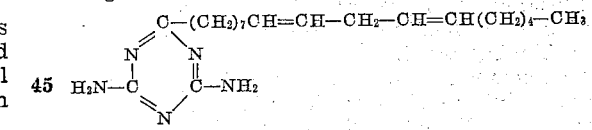

of melting point of approx. 94° C. is obtained.

Having thus disclosed the invention, what is claimed is:

1. A 2-substituted guanamine having the following formula

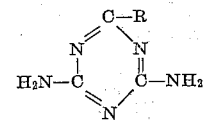

in which R is an aliphatic radical having at least nine carbon atoms.
2. Stearoguanamine.
3. Palmitoguanamine.
4. Lauroguanamine.

FRANZ GRÜN,
*Administrator of the Estate of Adolf Grün, Deceased.*